US006600808B2

(12) United States Patent
Takada et al.

(10) Patent No.: US 6,600,808 B2
(45) Date of Patent: Jul. 29, 2003

(54) PART PROGRAM GENERATING APPARATUS AND PROGRAM FOR IMAGE MEASURING APPARATUS

(75) Inventors: Akira Takada, Kawasaki (JP); Koichi Komatsu, Kawasaki (JP); Masato Shimizu, Kawasaki (JP); Kozo Ariga, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/219,495

(22) Filed: Aug. 16, 2002

(65) Prior Publication Data
US 2003/0039334 A1 Feb. 27, 2003

(30) Foreign Application Priority Data

Aug. 21, 2001 (JP) ........................................ 2001-250311

(51) Int. Cl.[7] .............................................. G01N 23/04
(52) U.S. Cl. ........................................... 378/62; 378/98
(58) Field of Search ................................ 378/4, 21, 62, 378/98

(56) References Cited

FOREIGN PATENT DOCUMENTS

| JP | A8-247719 | 9/1996 |
| JP | A11-63922 | 3/1999 |
| JP | A2001-319219 | 11/2001 |

OTHER PUBLICATIONS

U.S. patent application Ser. No. 09/852,326, Takada et al., filed May 10, 2001.

Primary Examiner—David V. Bruce
(74) Attorney, Agent, or Firm—Oliff & Berridge, PLC

(57) ABSTRACT

An apparatus and program is provided for efficiently generating a part program for image measuring apparatus, conveniently usable for the operator without complicated operations. CAD data of a work is displayed and a target graphic is selected from the CAD data. A detection position mark is displayed on the selected graphic. The CAD data is displayed at a certain magnification that allows the position of the selected target graphic to be identified relative to the entire of the CAD data. In this state, a detection position mark is displayed in the vicinity of the target graphic, and the operator determines the location of the detection position mark.

20 Claims, 14 Drawing Sheets

FIG. 8

PRIMARY CANDIDATE

| GRAPHIC ELEMENT | TOOL TYPE | NUMBER OF TOOLS | LENGTH :W(pixel) | OFFSET :OFF(%) |
|---|---|---|---|---|
| LINE | 2 | 3 | 20 | 10 |
| CIRCLE | 1 | 4 | 20 | — |
| CIRCULAR ARC | 1 | 3 | 20 | 10 |

SECONDARY CANDIDATE

| GRAPHIC ELEMENT | TOOL TYPE | NUMBER OF TOOLS | LENGTH :W(pixel) | OFFSET :OFF(%) |
|---|---|---|---|---|
| LINE | 1 | 3 | 15 | 10 |
| CIRCLE | 2 | 4 | 15 | — |
| CIRCULAR ARC | 2 | 3 | 15 | 10 |

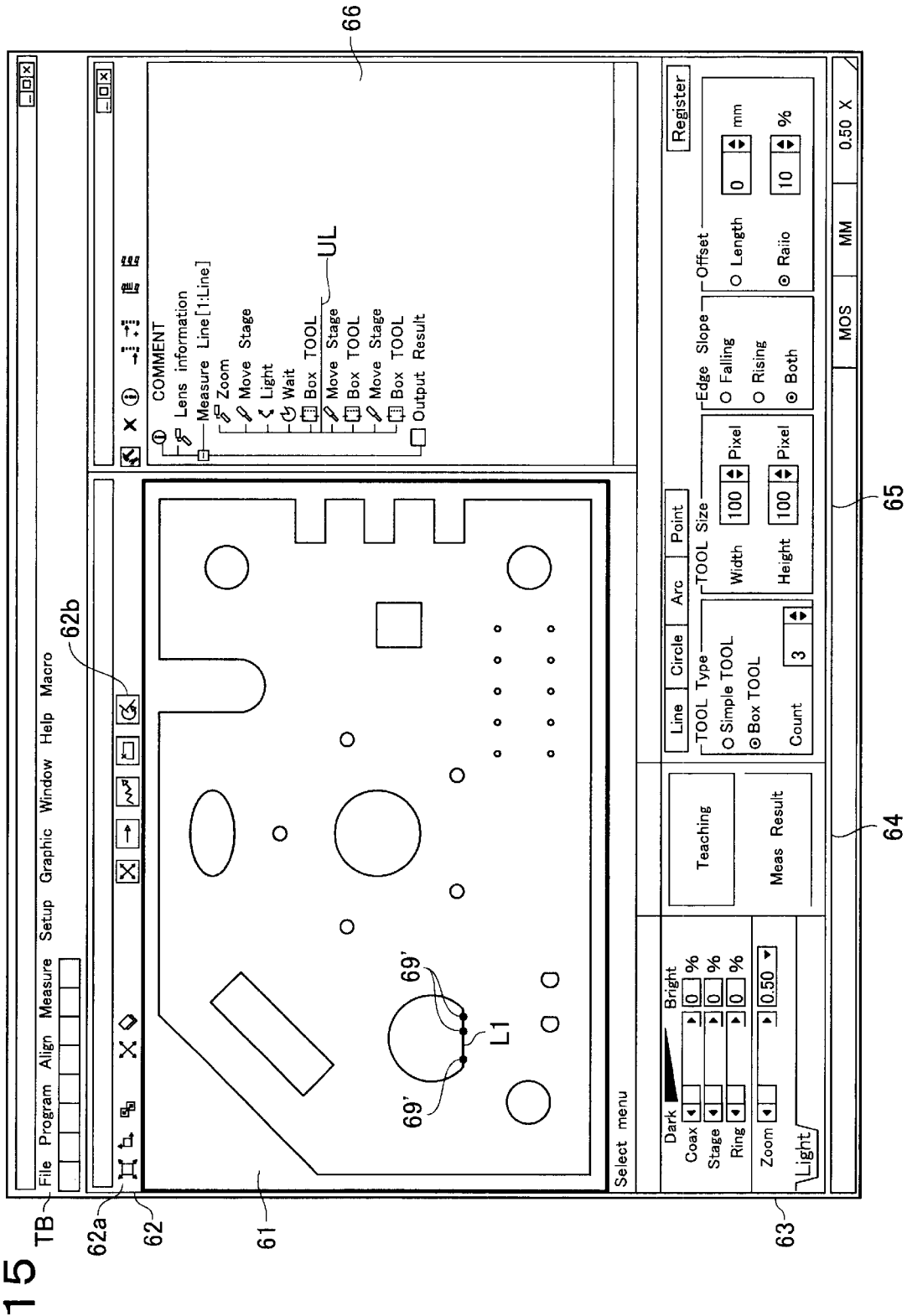

PART PROGRAM GENERATING APPARATUS AND PROGRAM FOR IMAGE MEASURING APPARATUS

CROSS-REFERENCE TO RELATED APPLICATIONS

This application is based upon and claims the benefit of priority from the prior Japanese Patent Application No. 2001-250311, filed on Aug. 21, 2001, the entire contents of which are incorporated herein by reference.

BACKGROUND OF THE INVENTION

1. Field of the Invention

The present invention relates to a part program generating apparatus and program for image measuring apparatus. The apparatus and program utilizes an offline teaching system that can offline generate a part program for an image measuring apparatus simply, collectively and automatically on the basis of shape data of a work to be measured without the use of the real machine.

2. Description of the Related Art

In the conventional offline teaching for a CNC (computer numerical control)image measuring apparatus, two-dimensional CAD data is displayed on a screen. Then, an operator selects a graphical element to be measured using a mouse and the like. The operator also determines which edge detection tool should be employed to measure the graphical element, and further determines and inputs where the edge detection position should be settled in the edge detection tool to generate a part program.

In the conventional part program generator (generating program) for an image measuring apparatus, if a measurement target graphic is selected, an edge detection tool for detecting the selected graphic is chosen and located automatically or manually. Such the edge detection tool includes a simple tool, a circular tool and a box tool, for example. An example of the simple tool is shown in FIG. 20. The simple tool 71 is employed to detect a point as an edge point where the density level sharply changes when an image obtained by imaging a work is scanned along the arrow from the base to the tip. If the simple tool is employed, it is required to set the number and locations of arrows, lengths W (the number of pixels) and the number of offsets.

In the conventional image measuring apparatus, the number and locations of arrows are previously entered at the measurement condition input stage as default values, which are basically employed to reduce loads on operations. Depending on the target graphic, however, it may be often desired to use a different value from the default value. In the conventional image measuring apparatus, if the default value is to be changed, the selected target graphic is enlarged first, and then the number and locations of arrows are adjusted in the enlarged graphic using a mouse, for example. Such the setting performed on the basis of the enlarged target graphic, however, makes the operation for instructing the enlarged display troublesome. In addition, the enlarged display makes it difficult to identify the position of the enlarged section relative to the entire. This causes an operational problem such as a difficulty in determination on where the arrow is placed, for example.

SUMMARY OF THE INVENTION

A first aspect of the invention is provided with an apparatus for generating a part program with description of measurement procedures to be used in an image measuring apparatus for measuring a work based on image data obtained by imaging the work. The apparatus comprises CAD data input means for reading CAD data of the work; CAD data display means for graphically displaying the CAD data read by the CAD data input means; means for selecting a target graphic from the CAD data displayed on the CAD data display means; and means for determining a location to place an edge detection tool on the selected target graphic, in which the CAD data is displayed on the CAD data display means at a certain magnification that allows the position of the selected target graphic to be identified relative to the entire of the CAD data, a detection position mark is displayed in the vicinity of the target graphic, and the location of the detection position mark is determined by the operator. A part program for measuring the target graphic is generated based on a result determined by the means for determining.

According to the first aspect of the invention, the means for selecting is employed to select a target graphic from the CAD data read and displayed. The target graphic is displayed at a certain magnification that allows the position of the target graphic to be identified relative to the entire of the CAD data. In addition, a detection position mark is displayed in the vicinity of the target graphic. The operator can determine the location of the detection position mark using the means for determining. Thus, the operator can freely determine the position of the edge detection tool to be located on the target graphic and locate the detection tool on an appropriate location while grasping the position of the target graphic relative to the work. It is also possible to reduce the numbers of operations of enlargement and reduction.

A second aspect of the invention is provided with a program for generating a part program with description of measurement procedures to be used in an image measuring apparatus for measuring a work based on image data obtained by imaging the work. The program comprises the execution steps of: reading CAD data of the work; graphically displaying the CAD data read; selecting a target graphic from the CAD data displayed; determining a location to place an edge detection tool on the selected target graphic, in which the CAD data is displayed at a certain magnification that allows the position of the selected target graphic to be identified relative to the entire of the CAD data, a detection position mark is displayed in the vicinity of the target graphic,and the location of the detection position mark is determined by the operator; and generating a part program for measuring the target graphic based on the determined result.

BRIEF DESCRIPTION OF THE DRAWINGS

The present invention will be more fully understood from the following detailed description with reference to the accompanying drawings, in which:

FIG. 8 is a diagram showing the contents of the setting of measurement conditions;

FIG. 15 shows an example of a display screen on CRT 25 in the macro program A;

DETAILED DESCRIPTION OF THE EMBODIMENTS

Figure 1:
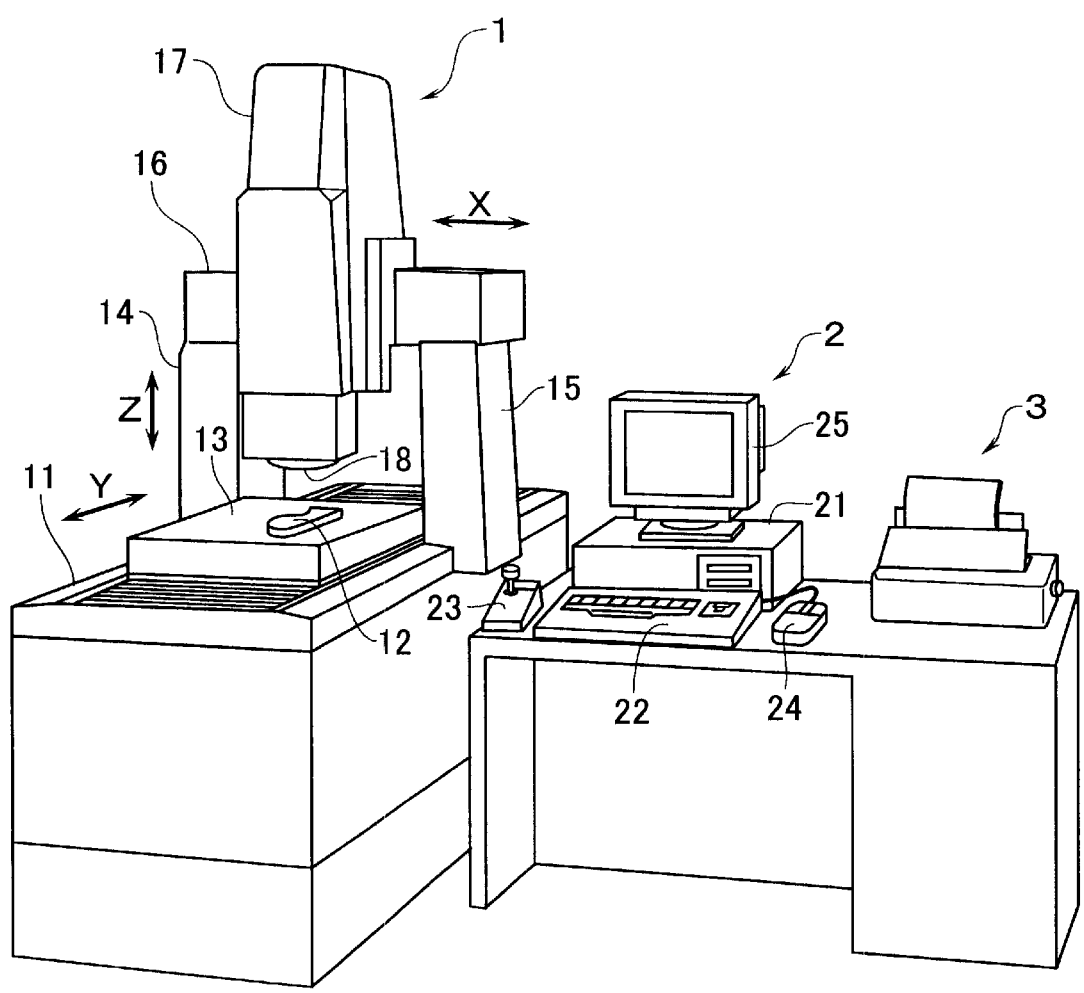
FIG. 1 is a perspective view showing an arrangement of a non-contact image measuring system according to an embodiment of the present invention.

Embodiments of the present invention will now be described with reference to the accompanying drawings. FIG. 1 is a perspective view showing the entire arrangement of an image measuring system according to a first embodiment of the present invention.

The system comprises a non-contact image-measuring apparatus 1, a computer system 2 for controlling the image-measuring apparatus 1 and executing necessary data processing, and a printer 3 for printing out measured results.

The image-measuring apparatus 1 has the following arrangement. A measurement table 13 is mounted on a frame 11 and an object to be measured (hereinafter referred to as a "work") 12 is mounted on the measurement table 13. The measurement table 13 is driven in the Y direction from a Y-axis driving mechanism not depicted. Support arms 14, 15 are secured on the center portions of both sides of the frame 11, extending upwardly therefrom. An X-axis guide 16 is secured on both upper ends of the support arms 14, 15 to link between them. An imaging unit 17 is supported on the X-axis guide 16. The imaging unit 17 is driven along the X-axis guide 16 from an X-axis driving mechanism not depicted. A CCD camera 18 is mounted on the lower surface of the imaging unit 17, opposing to the measurement table 13. In addition, the imaging unit 17 contains an illumination device, a focusing mechanism and a Z-axis driving mechanism for positioning the CCD camera 18 in the Z direction, though they are not depicted.

The computer system 2 comprises a computer 21, a keyboard 22, a joystick box (hereinafter referred to as "J/S") 23, a mouse 24 and a CRT display 25.

Figure 2:
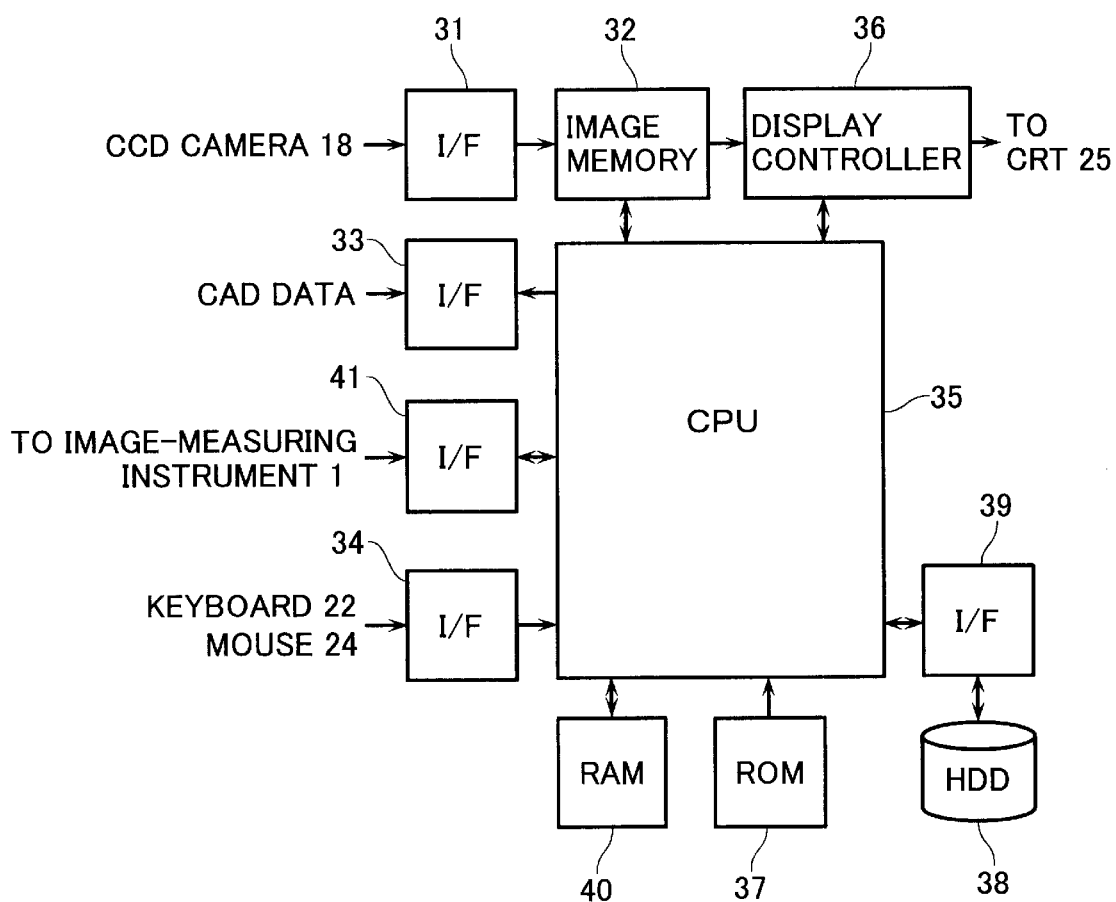
FIG. 2 is a block diagram showing an arrangement of a computer in the image measuring system according to the embodiment of the present invention.

The computer 21 has an arrangement as shown in FIG. 2, for example. The image information of the work 12 input from the CCD camera 18 is stored in an image memory 32 through an interface (hereinafter referred to as "I/F") 31.

CAD data of the work 12 generated by a CAD system, not depicted, is input into a CPU 35 via an I/F 33, thereafter expanded in bitmap image information at the CPU 35 and finally stored in the image memory 32. The image information stored in the image memory 32 is displayed on the CRT display 25 through a display controller 36.

Code information and positional information input from the keyboard 22, J/S 23 and mouse 24 are on the other hand introduced into the CPU 35 via an I/F 34. The CPU 35 executes a process for executing a measurement, a process for generating a part program and a process for displaying a measured result. These processes are executed in accordance with micro programs stored in a ROM 37, and with a measurement execution program, a measured result display program, a part program generator and a part program all stored in a RAM 40 via an I/F 39 from the HDD 38.

The CPU 35 controls the image measuring apparatus 1 via an I/F 41 in accordance with the measurement executing process. The HDD 38 stores the CAD data, the measurement execution program, the measured result display program and the part program. The RAM 40 stores various programs and provides work areas for various processes.

Figure 3:
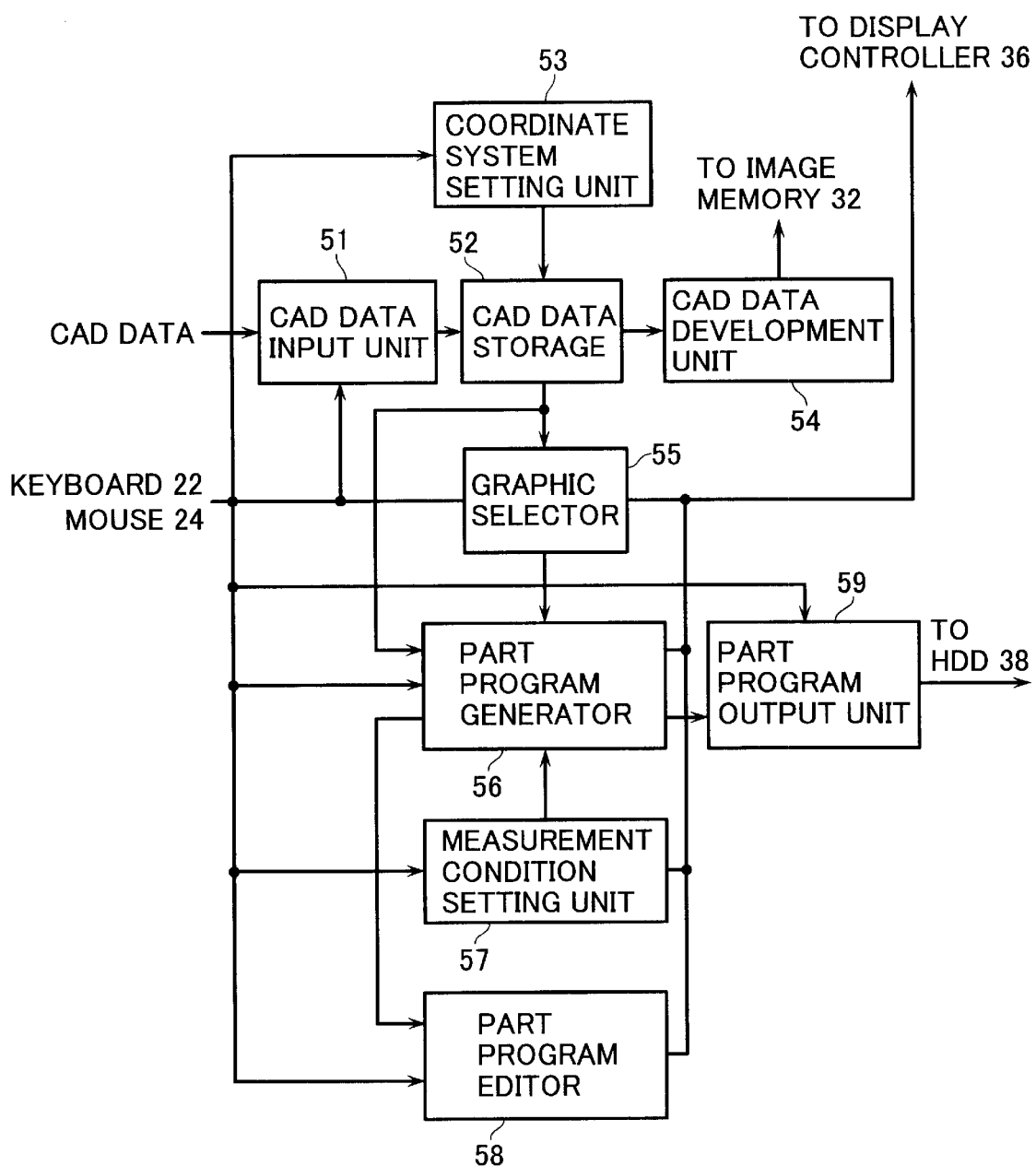
FIG. 3 is a functional block diagram of an apparatus for generating a part program in the systems of FIGS. 1, 2.

FIG. 3 is a functional block diagram of an apparatus for generating a part program using offline teaching, realized from the part program generating program, the CPU 35 and their periphery circuits.

CAD data created as a design drawing of the work 12 is read at a CAD data input unit 51. The CAD data input unit 51 converts the CAD data with a designated magnification into a designated reading format (for example, DXF or IGES), based on operations of the keyboard 22, the mouse 24 and the like. The CAD data magnified and read is stored in a CAD data storage 52. A coordinate system setting unit 53 executes a coordinate setting process for matching a coordinate system for the CAD data stored in the CAD data storage 52 with a work coordinate system. A CAD data development unit 54 subjects the CAD data stored in the CAD data storage 52 to vector/raster conversion and then supplies the converted data to the image memory 32. From the CAD data stored in the CAD data storage 52, a graphic selector 55 selects CAD data of a graphic element corresponding to a position to be measured in the work 12, based on the operation of the mouse 24. A part program generator 56 generates a part program file, which describes measurement procedures for the graphic element selected at the graphic selector 55, based on a measured result for a mark 69 later described and on measurement conditions set at a measurement condition setting unit 57. The part program file generated is subjected to an appropriate editing process at a part program editor 58. The part program file thus generated and edited is stored in the HDD 38 and the like via a part program output unit 59.

Figure 4:
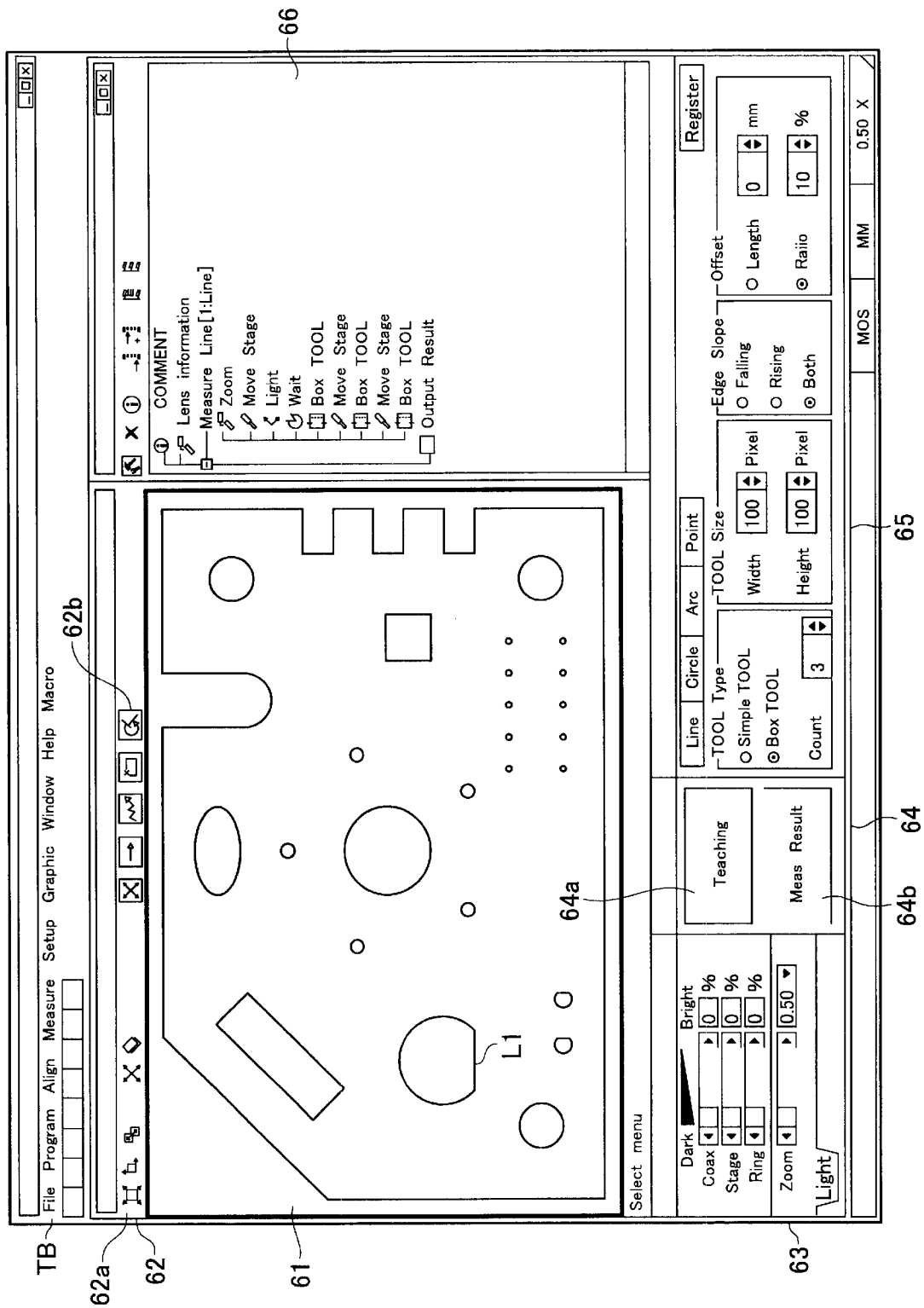
FIG. 4 shows an example of display on CRT 25 in the apparatus shown FIG. 1.

A typical display example of the display screen on the CRT 2 during execution of a part program generator according to this embodiment will be described based on FIG. 4.

On the display screen, a CAD data display section 61, a variety of icons 62, a measurement condition adjusting section 63, an indication section 64, an edge detection tool setting section 65 and a part program display section 66 are displayed.

On the CAD data display section 61, CAD data images supplied from the image memory 32 and expanded at the display controller 36 are displayed. A target graphic to be measured can be selected through an operation of selection such as clicking the mouse 24 when its pointer indicates the variety of graphical elements (circle, straight line and ellipse) displayed on the CAD data display section 61. The icons 62 include an icon 62a for starting up a variety of programs and an icon 62b for selecting a method of selecting a target graphic later described. The measurement condition adjusting section 63 is employed to set an illumination condition and other measurement conditions. The indication section 64 includes a teaching indication icon 64a and a measured result displaying mode indication icon 64b. After the selection of the target graphic at the CAD data display section 61, the mouse 24 is employed to click the teaching indication icon 64a. This is operative to automatically generate a part program for measuring the target graphic selected. The measured result displaying mode indication icon 64b is employed to start up a program for selecting a mode of displaying the measured result after execution of the part program. The edge detection tool setting section 65 is employed to set a type, size and offset of the edge detection tool in accordance with the type of the graphic element. The part program display section 66 displays the contents of the automatically generated part program when the teaching indication icon 64a is clicked.

Procedures for generating a part program in the non-contact image measuring system thus configured will be described next.

Figure 5:
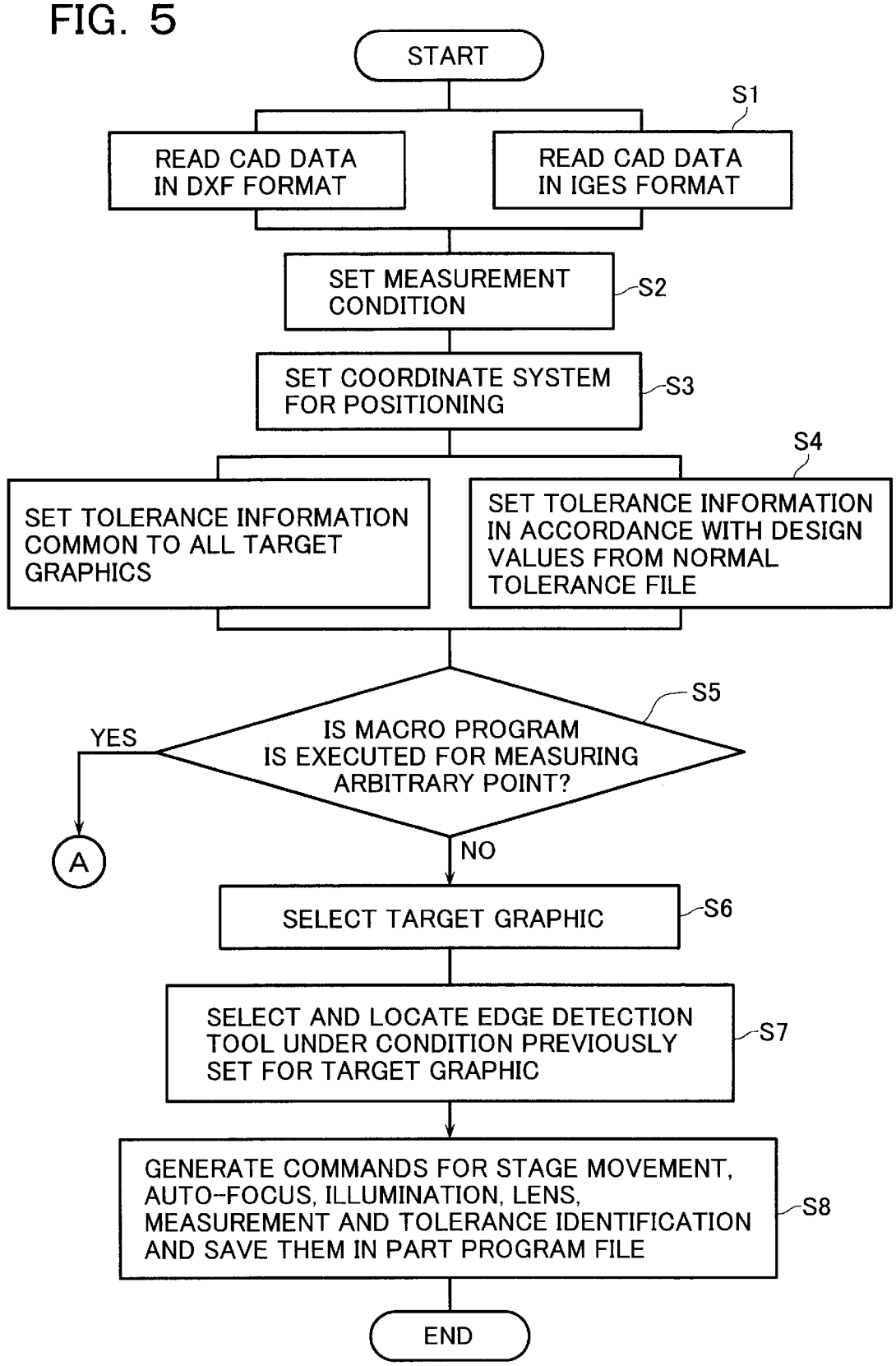
FIG. 5 is a flowchart showing the operation of the apparatus shown FIG. 1.

FIG. 5 is a flowchart showing procedures in a process for automatically generating a part program.

First, CAD data in a DXF or IGES format, previously created for the work 12 using a CAD system, is read and displayed as an image in CAD data display section 61 on the CRT display 25 (S1). A magnification can be set for reading the CAD data. Therefore, the reading can be performed independent of a reduced scale of the drawing employed for the CAD data of the work 12. For example, if the CAD data to be read is drawn with a reduced scale of 0.5×, setting of a magnification of 2× for reception makes it possible to read the CAD data of the work 12 already converted into the actual size.

Settings of measurement conditions are performed next (S2). As for illuminations, settings are performed at the measurement condition adjusting section 63, for example, on an illumination type such as reflected illumination, transmission illumination, ring fiber illumination and program-controlled ring illumination, and on a light quantity of the illumination from the darkest (0%) to the brightest (100%). As for lens, settings are performed similarly at the measurement condition adjusting section 63 on lens powers of several lens such as fixed power lens, program-controlled power turret and program-controlled zoom lens. With regard to edge detection tools, settings are performed on types of edge detection tools, the number of edge detection tools to be placed, sizes of edge detection tools and offset values, for example. These settings on edge detection can be utilized when an edge detection tool is automatically selected and placed as described later.

Figure 6A:
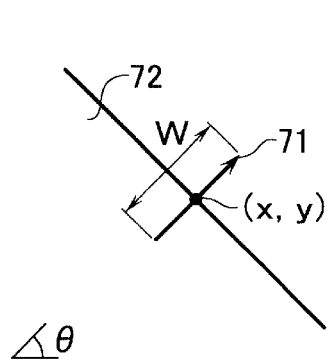
FIGS. 6(A) and 6(B) show examples of edge detection tools.
Figure 6B:
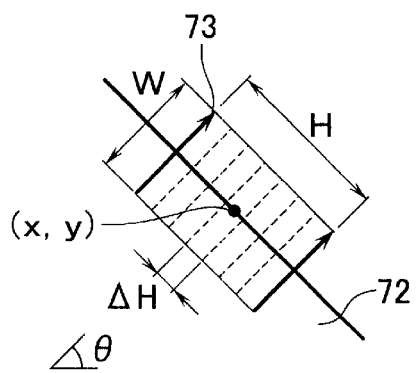

FIGS. 6A and 6B show examples of edge detection tools. FIG. 6A shows the simplest tool (hereinafter referred to as a "simple tool") 71, which is employed to detect an edge point. The edge point is defined as a point where the density level of image information 72 which is obtained by imaging the work 12 along the arrow from the base to the tip, sharply changes.

The simple tool is defined from positional coordinates of the central point (x, y), a length W and an angle θ. FIG. 6B shows a rectangular box tool (hereinafter referred to as a "box tool") 73, which is defined from positional information of the central point (x, y), a length W of arrows at both sides, a width H between the arrows and an angle θ. In the case of the box tool 73, the edge detection is repeatedly performed along the arrow from the base toward the tip at an interval ΔH previously set within the width H. Operational processes will be complicated if all parameters of the tools 71, 73 are derived from calculations per graphic element. Then, only positions and tilts of the tools 71, 73 are determined through calculations per graphic element selected as a target to reduce operational processes.

Figure 7A:
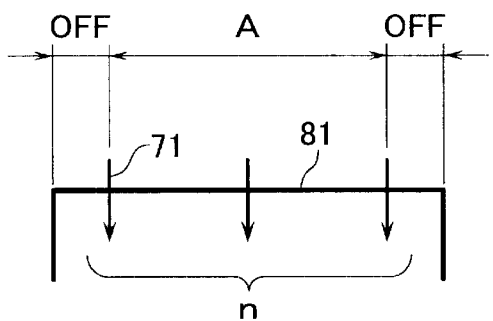
FIGS. 7(A) and 7(B) illustrate the setting of measurement conditions.
Figure 7B:
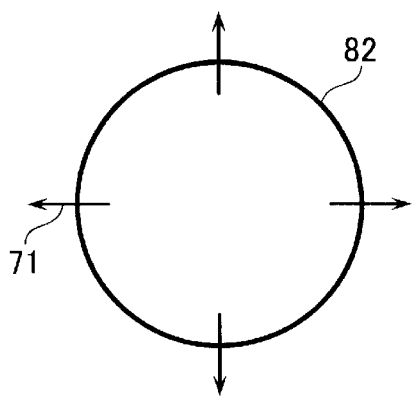

Therefore, in the setting of measurement conditions, only the type, the number, the length W (the number of pixels) and the number of offsets are set for the edge f per type of a graphic element (line, circle, circular arc and so forth). FIG. 7A shows an example of setting with respect to a line. In this example, the simple tool 71 is applied, the number n is equal to 3, offsets OFF are individually set from both ends of the line, and a region A is set for placing the simple tool 71. The setting of the offset OFF is intended to prevent the disablement of edge detection from erroneously occurring when the tool 71 is placed on an end of a line or circular arc. The offset OFF may be set with a length or per cent of a line length. FIG. 7B exemplifies an arrangement of four simple tools 71 in relation to a circle 82. No offset is required in the case of the circle.

The contents thus set are shown in FIG. 8. A tool type, the number of tools, a length W and an offset OFF are set per graphic element as an edge detection tool generating condition in the measurement condition setting unit 57. In this example, not only a primary candidate, but a secondary candidate is also set as another tool candidate in case of failing to generate the primary candidate tool.

Offline generation of a part program by the reading of the CAD data requires matching of the coordinate system for the CAD data-derived image information with the coordinate system of the work 12. Then, a coordinate system setting for positioning is performed (S3).

Next, setting of tolerance information necessary for tolerance identification between practically measured data and CAD data is performed by the measured result display mode setting icon 64b (S4). In this setting, several types of tolerances can be treated. For example, as the upper and lower limit tolerances with respect to coordinate values, angles and distances, the upper limit tolerance and the lower limit tolerance are employed to set permissible ranges above and below a design value. In addition, as tolerance ranges, with respect to position deviation and forms (straightness, circularity and so forth), tolerance zones are set. Further, tolerance information can be set for a fitting tolerance and others. The above tolerance information can be saved in a tolerance list.

Two setting methods are prepared to set the above tolerance information. One is of setting common tolerance information for all target graphics, and the other is of setting tolerance information corresponding to design values according to normal tolerance files.

The operator is required to determine which one is selected between a program for automatically locating an edge detection tool and a macro program A for locating an edge detection tool at an arbitrary position (S5).

If the former is selected, any special operation is not required and the control is shifted to the next step S6. If the latter is selected, it is required to start up the macro program A for locating an edge detection tool at an arbitrary position. For example, an item "Macro" may be prepared in the tool bar TB in the display screen on the CRT 2 to start up the macro program A when it is clicked.

Automatic Location of an Edge Detection Tool

Next, a target graphic is selected for the purpose of a part program generation from the CAD data display section 61 (S5).

When the target graphic is selected, the CPU 35 selects and locates an edge detection tool for each selected target graphic, based on the previously set generating condition on edge detection tools (S6).

Next, the CPU 35 generates other stage movement command, auto-focus command, illumination command, lens command, measurement command and tolerance identification command and adds them to the part program, then storing its part program file in the HDD 38 and the like (S8).

Thus generated part program is displayed on the part program display section 66.

Measurement of an Arbitrary Point

The macro program A for measuring an arbitrary point may be activated at the step S5. This case will be described with reference to a flowchart shown in FIG. 11 and to FIGS. 9–10, 12–14.

Figure 9:
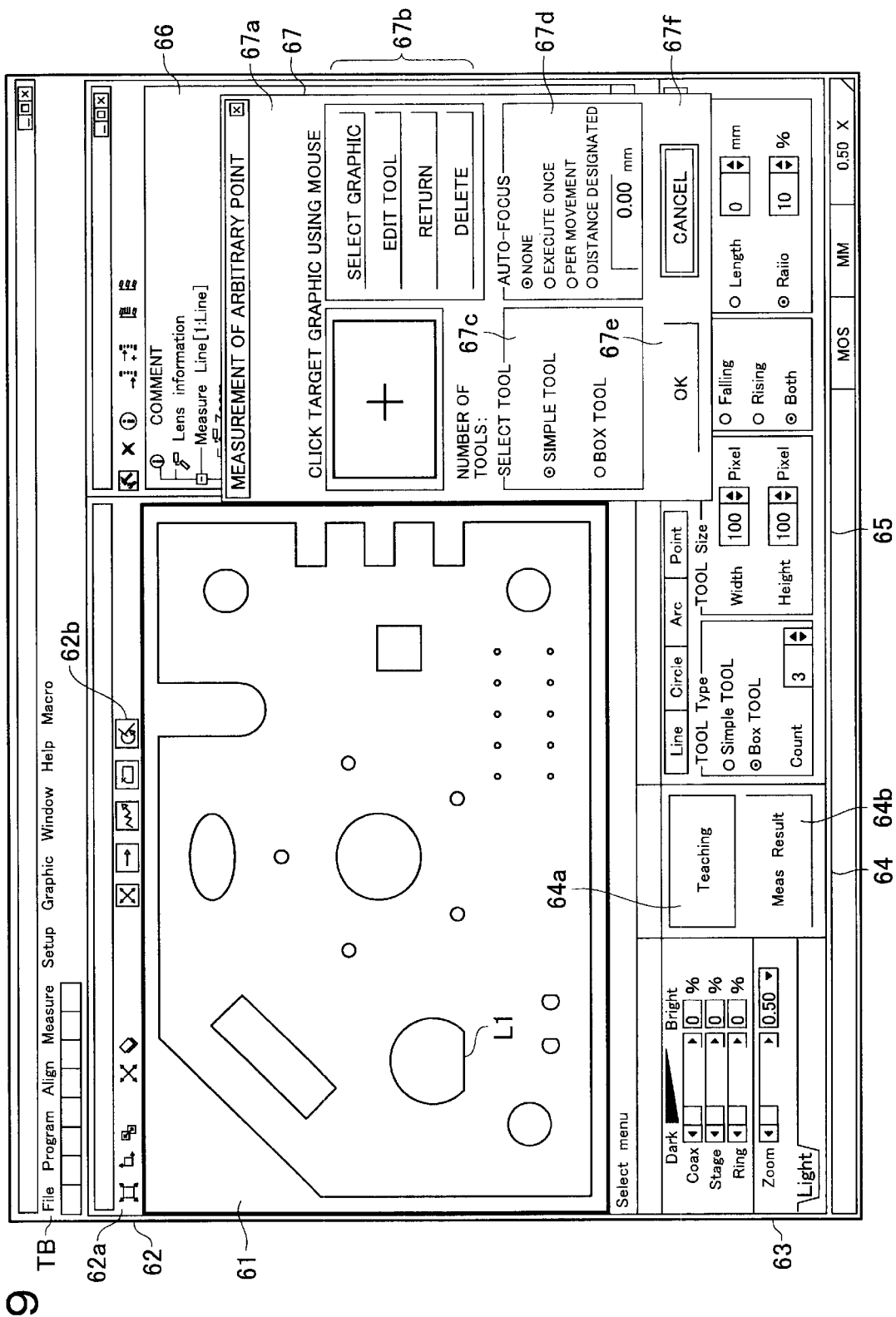
FIG. 9 shows an example of a display screen on CRT 25 when a macro program A is executed for locating an edge detection tool at an arbitrary position.

When the macro program A is activated for measuring an arbitrary point, as shown in FIG. 9, a small window 67 is displayed for executing the macro program. In the small window 67, an instruction window 67a, operation content selection icons 67b, a tool selection window 67c, an auto-focusing window 67d, an OK button 67e and a cancel button 67f are displayed. After the macro program A is activated, the operator first clicks a "graphic selection" icon in the operation content selection icons 67b. An instruction, "Click target graphic using mouse", is displayed together in the instruction window 67a. The operator manipulates the mouse 24 to select a target graphical element in the CAD data display section 61 and select a type of the edge detection tool (simple tool, box tool) in the tool selection window 67c (S9). It is assumed in this case that a straight line L1 shown in FIG. 9 is selected.

Figure 10:
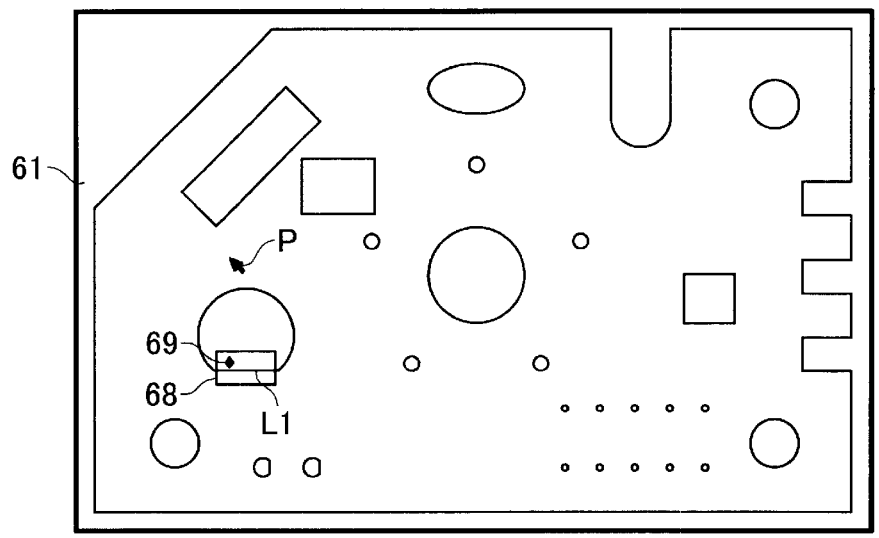
FIG. 10 shows an example of a display screen on CRT 25 when the macro program A is executed.
Figure 11:
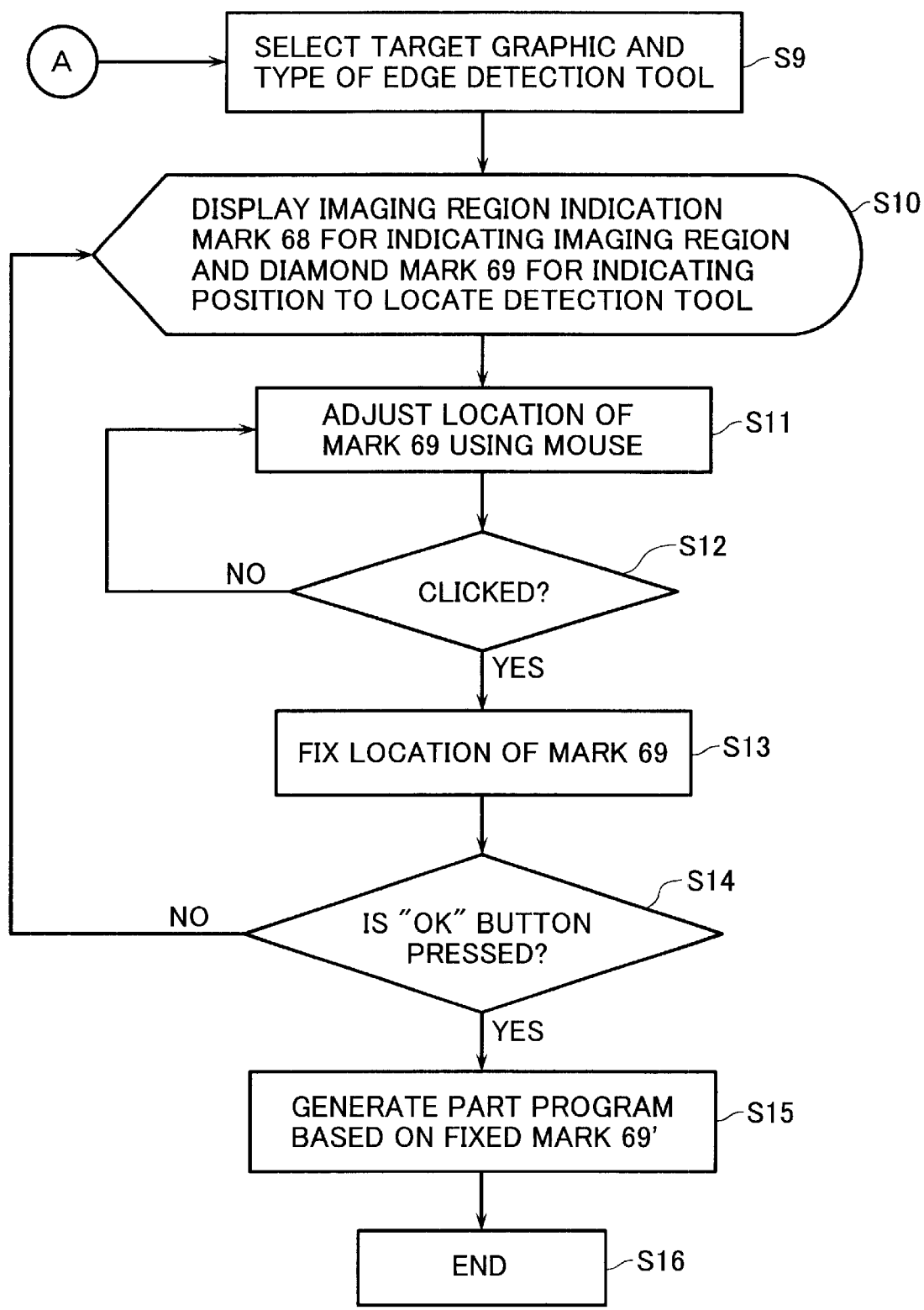
FIG. 11 is a flowchart of the macro program A.

As a result, on the straight line L1 as shown in FIG. 10, an imaging region indication mark 68 for indicating a region that allows imaging with a lens power determined at the measurement condition adjusting section 63 is displayed. A diamond mark 69 for designating a position to be measured is also displayed (S10). In addition, an instruction, "Designate a position to locate the edge detection tool using the mouse", is displayed in the instruction window 67a. The operator moves the pointer of the mouse 24 over the display section 61 to movably adjust the diamond mark 69 to arbitrarily alter the position to be measured (S11).

Figure 12A:
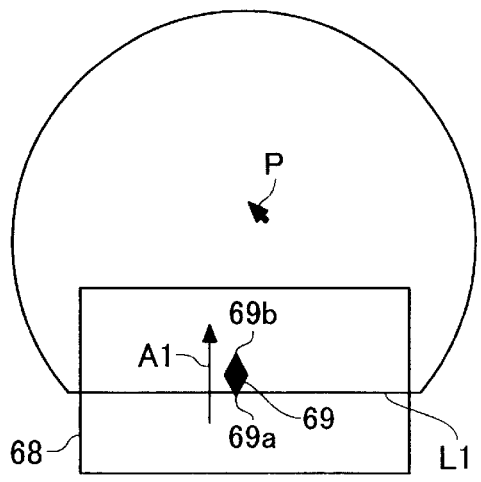
FIGS. 12(A) and 12(B) show a method of adjusting the location of the mark 69 in the macro program A.
Figure 12B:
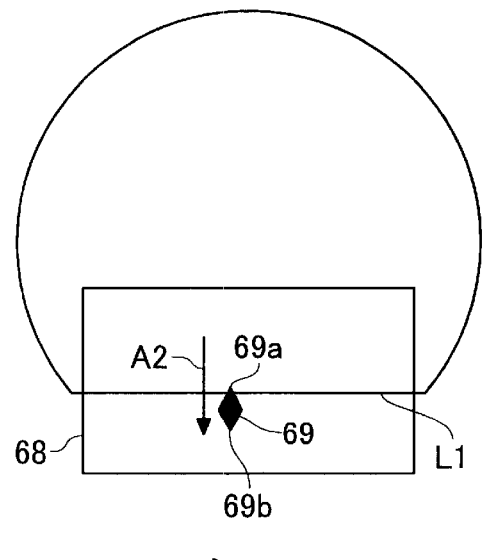
Figure 13:
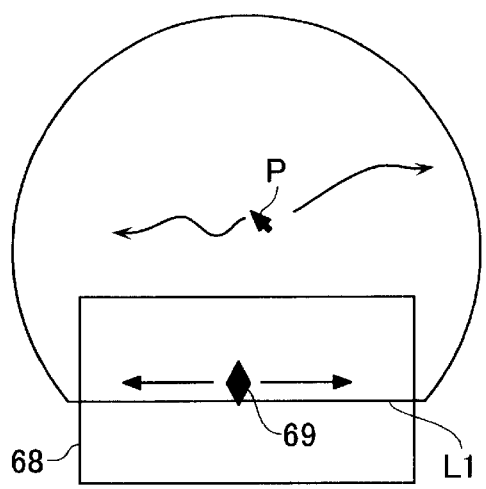
FIG. 13 shows a method of adjusting the location of the mark 69 in the macro program A.
Figure 14:
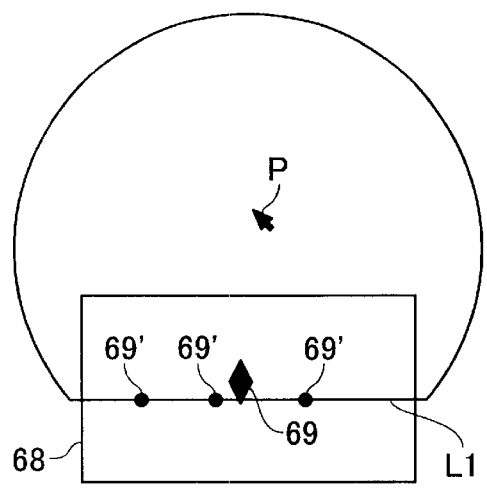
FIG. 14 shows a method of adjusting the location of the mark 69 in the macro program A.

With respect to the diamond mark 69, its meaning and moving method will be described with reference to FIGS. 12–14. FIGS. 12–14 selectively show a part in the vicinity of the straight line L1 selected as the target graphic. As shown in FIG. 12, the diamond mark 69 has vertexes in the longitudinal direction. One 69a of the vertexes is displayed in contact with the straight line L1. As shown in FIG. 12A, if the pointer P is located above the straight line L1, the vertex 69b is also located above the straight line L1. As shown in FIG. 12B, if the pointer P is located beneath the straight line L1 to the contrary, the vertex 69b is also located beneath the straight line L1. Thus, the display position of the straight line L1 or target graphic varies in accordance with the display position of the pointer P.

In the case of FIG. 12A, the diamond mark 69 means that the edge detection is performed in the direction from the diamond mark 69 toward the display position of the pointer P, that is, in the direction along the upward-pointing arrow A1. In the case of FIG. 12B, the diamond mark 69 means that the edge detection is performed in the direction from the diamond mark 69 toward the display position of the pointer P, that is, in the direction from the vertex 69a to the vertex 69b (the direction along the arrow A2). The vertex 69a is in contact with the line L1 or target graphic and the vertex 69b is not in contact with it.

The method of moving the diamond mark 69 is described with reference to FIG. 13. The diamond mark 69 can be moved as the pointer P is moved using the mouse 24. The pointer P is not required to meet with the location of the diamond mark 69. As shown in FIG. 13, the pointer P may be shifted laterally at locations apart from the diamond mark 69. When the pointer P is moved in arbitrary directions as indicated by arrows shown in FIG. 13, a lateral component of the movement, that is, a moving component in the direction along the extension of the line L1, is calculated. The calculated component is employed to move the diamond mark 69 laterally. The diamond mark 69 can move along the line L1 within only the imaging region display mark 68. Therefore, the signal from the mouse 24 is neglected beyond the moving limit.

Through the above operation, if the diamond mark 69 is coincident with the location (and direction) to be measured, the left button on the mouse 24 is clicked (S12). When it is clicked, the position of the mark 69 is fixed (S13). Before the click operation, it is still possible to movably adjust the mark 69 using the mouse 24.

The straight line L1 or target graphic is displayed on the CAD data display section 61 at a certain magnification that allows the position of the line to be identified relative to the entire CAD data. Therefore, the operator can freely determine the position of the mark 69 while grasping the position of the straight line L1 relative to the entire.

After the position of the mark 69 is fixed, as shown in FIG. 14, the diamond mark 69 turns into a black dot mark 69' and a new diamond mark 69 is displayed at a position slightly shifted from the black dot 69'. Instead of such the shape variation, the color or the size may be changed or the display may be changed from blinking to lighting up. Alternatively, an enlarged image about the mark 69' may be displayed when the pointer P is met with the fixed black dot 69' and the mouse 24 is double-clicked.

An indication, "Designate a new measurement location or press OK button", is displayed in the instruction window 67a to facilitate the operator for the next operation. If it is required to designate a new measurement location, the newly displayed diamond mark 69 is movably adjusted and the mouse 24 is clicked. If it is not required to designate a new measurement location any more, the OK button 67e is clicked (S14). In this case, based on the display position and scanning direction of the already fixed mark 69', a part program is automatically generated (S15) and the macro program A for designating an arbitrary measurement location is terminated (S16). If the cancel button 67f is pressed, the macro program A is terminated without generating a part program.

If it is desired to delete the once fixed mark 69', prior to pressing the OK button 67e or the cancel button 67f, it is required to click the "Delete" f icon in the operation content selection icons 67b. Then, contacting the pointer P with the mark 69' to be deleted, the mouse 24 is clicked.

The generated part program is displayed in the part program display section 66 as shown in FIG. 15 similar to the above-described automatic arrangement of the edge detection tool. When the mouse 24 is employed to click either one of the marks 69', among syntaxes for part programs displayed in the part program display section 66, the syntax for measuring the location of the clicked mark 69' is underlined with an underline UL. If a different mark 69' is clicked, the underline UL is shifted to a part corresponding to the different mark 69'. Instead of the underline UL, the corresponding syntax may be inversely displayed or its color may be changed. In a word, any mode of display can be employed if the display clarifies the relation between the mark 69' and the corresponding syntax. To the contrary, if the mouse 24 is employed to click one of the syntaxes for part programs displayed in the part program display section 66, the color of the mark 69' at the measurement location corresponding to the syntax is changed. Instead of the color variation, the display may be switched between blinking and lighting. This allows the operator to confirm the position to be measured and the measurement order and tool.

In the above embodiment, the example of the straight line selected as the target graphic is described. The target graphic may be a circle, a circular arc, an ellipse, an elliptical arc and a hyperbola. In these cases, the similar method of selecting a measurement location may be applied, needless to say.

Second Embodiment

Figure 16:
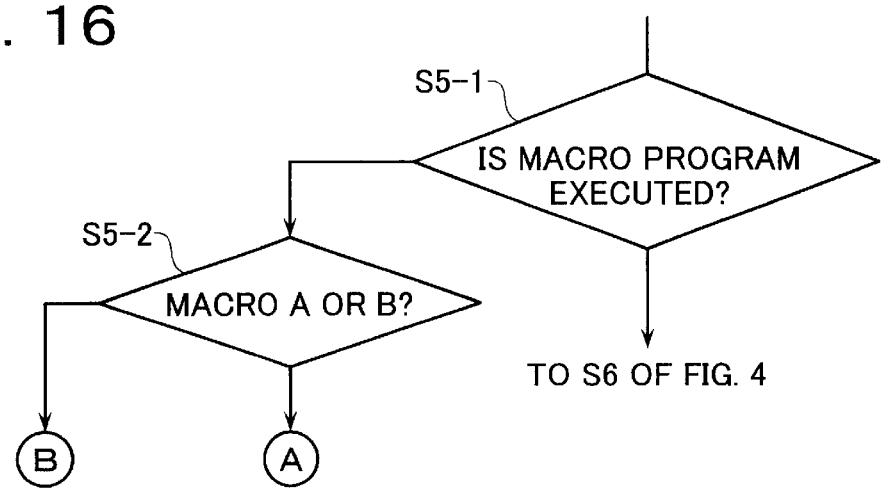
FIG. 16 is a flowchart showing operations according to a second embodiment of the present invention.

In the first embodiment, as shown at the step S5 in the flowchart of FIG. 5, the program for automatically selecting and locating an edge detection tool and the macro program A for manually locating an edge detection tool at an arbitrary position are selectively executed. To the contrary, the second embodiment is configured to execute a macro program B for measuring a distance between a certain line and an arbitrary point, as shown in FIG. 16, in addition to the above two options. The execution of a macro program is selected at S5-1 and which of the macro programs A and B to be executed is selected at S5-2. Others are similar to those in the first embodiment.

Figure 17:
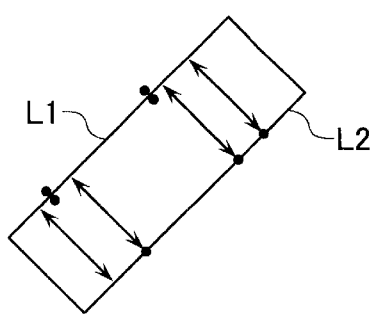
FIG. 17 illustrates contents executed by a macro program B according to the second embodiment of the present invention.

As shown in FIG. 17, the macro program B is employed to measure a distance from a standard graphic L1 to an arbitrary point on a target graphic L2. The operator is intended to select an arbitrary point on the graphic L2. The macro program B is described below in detail with reference to FIGS. 18 and 19.

Figure 18:
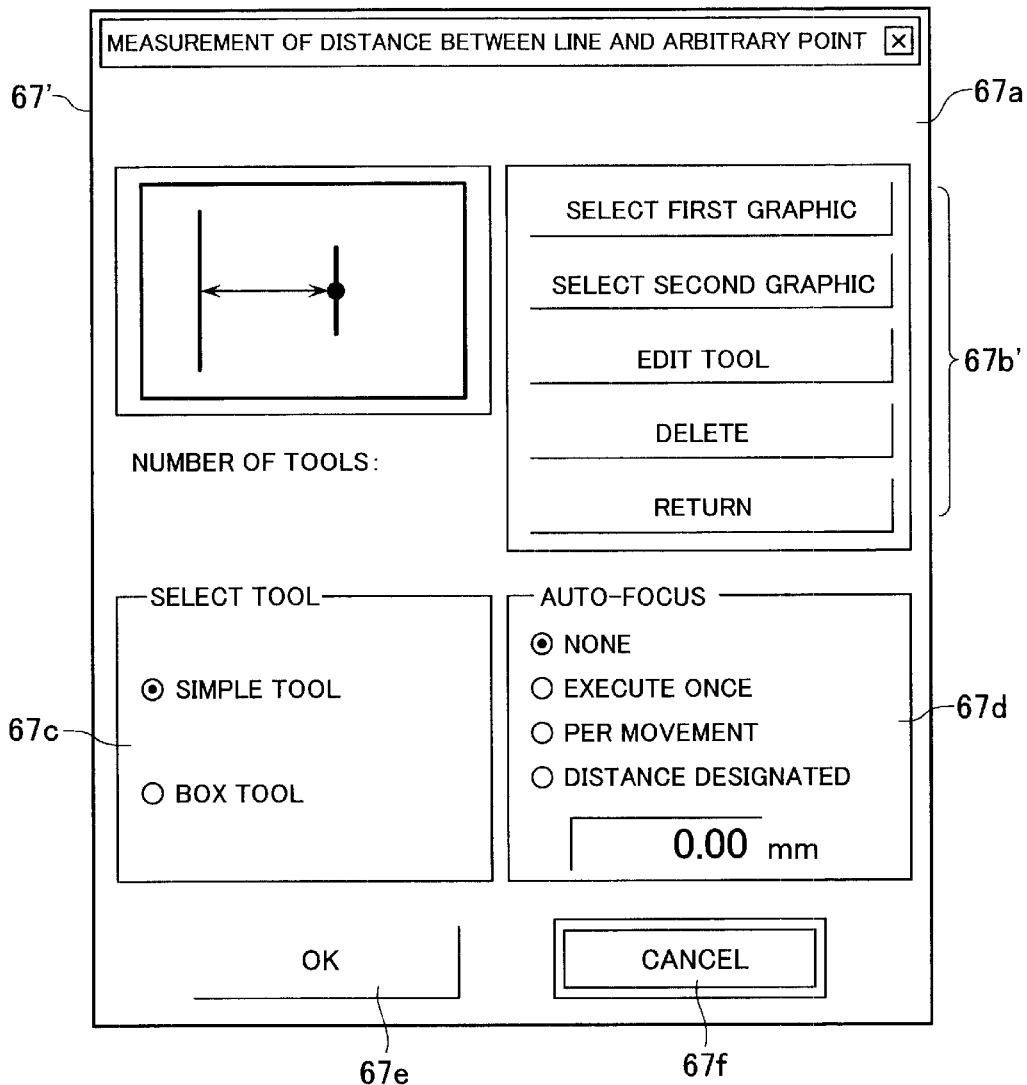
FIG. 18 shows an appearance of a small window 67' for executing the macro program B.
Figure 20:
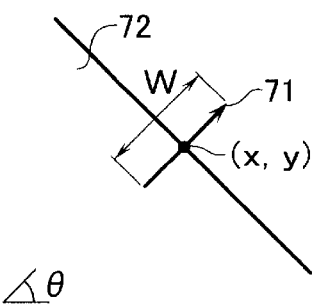
FIG. 20 shows a conventional edge detection tool.

When the macro program B is selected, a small window 67' as shown in FIG. 18 is displayed on the CRT 25 instead of the small window 67 shown in FIG. 9. The same numeral references are employed to designate the same functions as those in FIG. 9 and accordingly omitted to describe again. The small window 67' includes an operation content selection icon 67b', which contains a "select first graphic" icon and a "select second graphic" icon. The "select first graphic" icon is clicked using the mouse 24 prior to the selection of the standard graphic such as the graphic L1 shown in FIG. 17. The "select second graphic" icon is clicked using the mouse 24 prior to the selection of the target graphic such as the graphic L2 shown in FIG. 17.

Figure 19A:
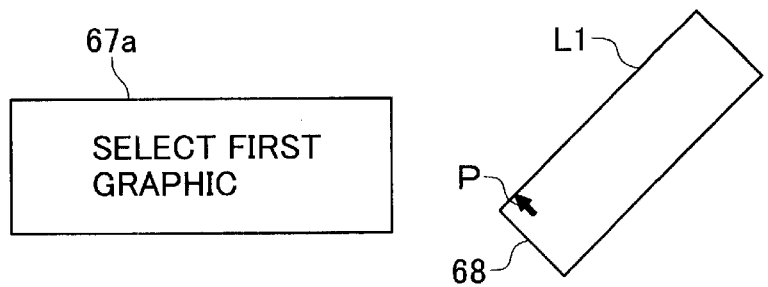
FIGS. 19(A)–19(D) show operational contents of the macro program B and display contents of the screen 25.
Figure 19B:
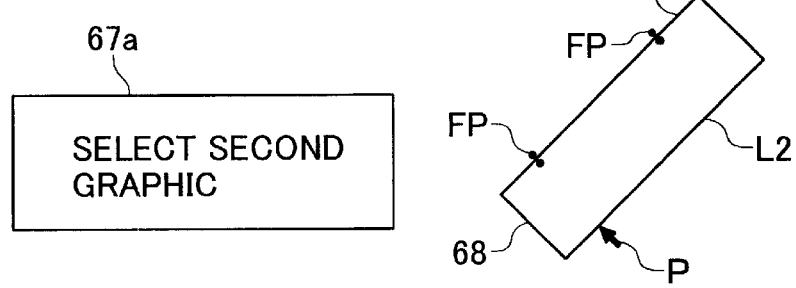

The operation of the macro program B is described next in accordance with FIG. 19. In FIGS. 19A–B, the contents displayed in the instruction window 67a are shown at the left side. Among the contents displayed in the CAD data display section 61, only the selected graphics L1, L2 and the display contents associated with the selecting operation are shown at the right side and other parts are omitted to depict.

Figure 19C:
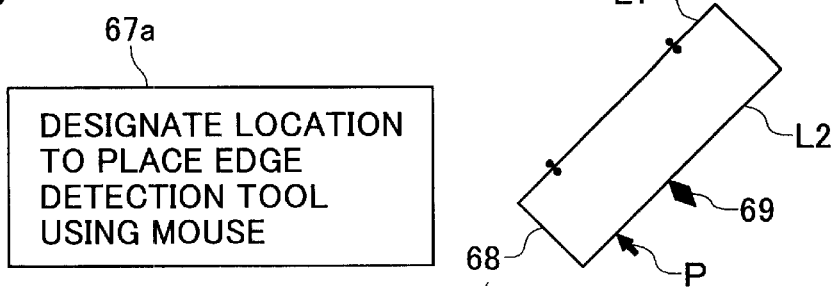
Figure 19D:
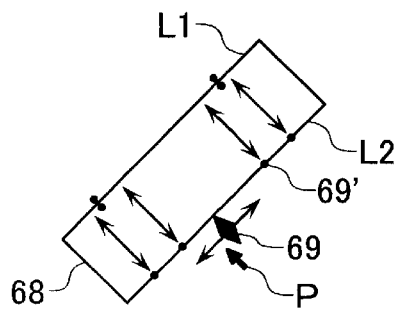

After the macro program B is activated, the operator first clicks the "select first graphic" icon using the mouse 24. As a result, as shown in FIG. 19A, an instruction, "Select first graphics", is displayed in the instruction window 67a. The operator selects a graphic as the standard graphic (the straight line L1 in this case) using the mouse 24. After the selecting operation, as shown in FIG. 19B, a point indication FP for indicating finish of selection is displayed in the vicinity of the selected graphic L1. The operator then clicks the "select second graphic" icon using the mouse 24. As a result, an instruction, "Select second graphic", is displayed in the instruction window 67a. The operator selects a graphic as the target graphic (the straight line L2 in this case) using the mouse 24. After the selecting operation, as shown in FIG. 19C, a diamond mark 69 is displayed in the vicinity of the selected graphic L2.

At the same time, an instruction, "Designate location to place the edge detection tool using mouse", is displayed in the instruction window 67a. Using the mouse 24 to move the pointer P over the display section 61, the operator can movably adjust the diamond mark 69 to arbitrarily alter the measurement location.

If the mouse 24 is employed to move the pointer P in an arbitrary direction, among components of the moving direction, only a component along the straight line L2 is extracted by the CPU 35. As a result, the diamond mark 69 moves along the straight line L2 by an amount corresponding to the extracted component. Similar to the macro program A, the pointer P of the mouse 24 is not required to meet with the diamond mark 69 and the operation information on the mouse 24 beyond the moving limit is neglected.

Through the above operation, if the diamond mark 69 is coincident with the location (and direction) to be measured, the left button on the mouse 24 is clicked. When it is clicked, the diamond mark 69 turns into a black dot mark 69' and fixed at the position. In addition, a new diamond mark 69 is displayed at a position slightly shifted from the black dot 69'. If a desired number of measurement points are completely designated, the OK button 67e is clicked. In this case, a part program is automatically generated for measuring a distance (the arrow shown in FIG. 19D) between the display position of the mark 69' already fixed and the reference graphic L1, and the macro program B is terminated. If the cancel button 67f is pressed, the macro program B is terminated without generating any part program.

In the second embodiment, both the reference and target graphics are described as straight lines. Though, it may be possible to measure a distance between a straight line and another graphic such as a circle, an ellipse, a circular arc and a hyperbola.

As described above, the present invention is effective to efficiently generate a part program for image measuring apparatus, conveniently usable for the operator without complicated operations.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An apparatus for generating a part program with description of measurement procedures to be used in an image measuring apparatus for measuring a work based on image data obtained by imaging said work, said apparatus comprising:

CAD data input means for reading CAD data of said work;

CAD data display means for graphically displaying said CAD data read by said CAD data input means;

means for selecting a target graphic from said CAD data displayed on said CAD data display means; and means for determining a location to place an edge detection tool on said selected target graphic, in which said CAD data is displayed on said CAD data display means at a certain magnification that allows the position of said selected target graphic to be identified relative to the entire of said CAD data, a detection position mark is displayed in the vicinity of said target graphic, and the location of said detection position mark is determined by the operator, wherein a part program for measuring said target graphic is generated based on a result determined by said means for determining.

2. The apparatus according to claim 1, wherein said detection position mark is movable on said selected target graphic or within a certain range in the vicinity thereof.

3. The apparatus according to claim 2, wherein said certain range corresponds to an imaging magnification for imaging said target graphic when said target graphic is practically measured using said part program.

4. The apparatus according to claim 1, wherein a mouse is employed to adjust the location of said detection position mark in said means for determining.

5. The apparatus according to claim 4, further comprising display control means for controlling the display condition on said CAD display means, wherein said display control means alters the display location of a pointer of said mouse based on an operational state of said mouse, and varies said location of said detection position mark along said target graphic in accordance with movement of said pointer.

6. The apparatus according to claim 5, wherein said display control means only extracts a certain direction component in moving directions of said pointer and moves said detection position mark by an amount corresponding to said component in said certain direction.

7. The apparatus according to claim 1, wherein said detection position mark indexes the scanning direction of an edge detection tool placed at said location of said detection position mark.

8. The apparatus according to claim 7, wherein a mouse is employed to adjust the location of said detection position mark, and said scanning direction is indexed by a positional relation between said detection position mark and said pointer of said mouse.

9. The apparatus according to claim 1, further comprising a part program display means for displaying said generated part program, wherein said CAD data display means and said part program display means display a correspondent relation between said detection position mark and said part program.

10. The apparatus according to claim 1, further comprising display switching means for selectively switching said CAD data display means to an enlarged display state.

11. A program for generating a part program with description of measurement procedures to be used in an image measuring apparatus for measuring a work based on image data obtained by imaging said work, said program comprising the execution steps of:

reading CAD data of said work;

graphically displaying said CAD data read;

selecting a target graphic from said CAD data displayed;

determining a location to place an edge detection tool on said selected target graphic, in which said CAD data is displayed at a certain magnification that allows the position of said selected target graphic to be identified relative to the entire of said CAD data, a detection position mark is displayed in the vicinity of said target graphic, and the location of said detection position mark is determined by the operator; and generating a part program for measuring said target graphic based on said determined result.

12. The program according to claim 11, wherein said detection position mark is movable within a certain range in the vicinity of said selected target graphic.

13. The program according to claim 12, wherein said certain range corresponds to an imaging magnification for imaging said target graphic when said target graphic is practically measured using said part program.

14. The program according to claim 11, wherein a mouse is employed to adjust the location of said detection position mark.

15. The program according to claim 14, wherein the display location of a pointer of said mouse is altered based on an operational state of said mouse, and said location of said detection position mark is varied along said target graphic in accordance with movement of said pointer.

16. The program according to claim 15, wherein only a a certain direction component among moving directions of said pointer is extracted and said detection position mark is moved by an amount corresponding to said direction component in said certain direction.

17. The program according to claim 11, wherein said detection position mark indexes the scanning direction of an edge detection tool placed at said location of said detection position mark.

18. The program according to claim 17, wherein a mouse is employed to adjust the location of said detection position mark, and said scanning direction is indexed by a positional relation between said detection position mark and said pointer of said mouse.

19. The program according to claim 11, wherein said generated part program is displayed and a correspondent relation between said detection position mark and said part program is displayed.

20. The program according to claim 11, wherein said CAD data is selectively switched to an enlarged display state.

* * * * *